United States Patent [19]

Nakamura et al.

[11] Patent Number: 5,310,027
[45] Date of Patent: May 10, 1994

[54] CONTROL SYSTEM FOR ADJUSTING DAMPING FORCE COEFFICIENT OF SHOCK ABSORBER FOR AUTOMOTIVE SUSPENSION

[75] Inventors: Michiya Nakamura; Mitsuo Sasaki; Makoto Kimura, all of Kanagawa, Japan

[73] Assignee: Atsugi Unisia Corporation, Japan

[21] Appl. No.: 924,967

[22] Filed: Aug. 5, 1992

[30] Foreign Application Priority Data

Aug. 6, 1991 [JP] Japan ................... 3-196721
Aug. 27, 1991 [JP] Japan ................ 3-068103[U]

[51] Int. Cl.⁵ .................... F16F 9/50; B60G 17/00
[52] U.S. Cl. .................................. 188/299; 188/319; 280/707; 280/714
[58] Field of Search ............. 188/299, 319, 280, 282, 188/285; 280/707, 714

[56] References Cited

U.S. PATENT DOCUMENTS

| | | | |
|---|---|---|---|
| 4,313,529 | 2/1982 | Kato et al. ................. | 280/714 X |
| 4,645,043 | 2/1987 | Imaizumi .................... | 188/319 |
| 4,702,123 | 10/1987 | Hirao et al. ............... | 188/299 X |
| 4,977,506 | 12/1990 | Hara et al. ................. | 280/707 X |
| 5,072,965 | 12/1991 | Wada et al. ................ | 280/707 |
| 5,150,915 | 9/1992 | Hoptry et al. .............. | 188/299 X |

FOREIGN PATENT DOCUMENTS 4204439 8/1992 Fed. Rep. of Germany .
63-146468 9/1988 Japan .

Primary Examiner—Robert J. Oberleitner
Assistant Examiner—Kevin D. Rutherford
Attorney, Agent, or Firm—Ronald P. Kananen

[57] ABSTRACT

A control system for a damping force coefficient of a shock absorber for a vehicle suspension provides a controller for correcting the position of a step motor. The controller sets the step motor at a predetermined position in a manner to intermittently move the step motor to a stop position restricted by a stopper and to reversely rotate it by a predetermined number of steps. Therefore, the step motor is precisely set at a home position without using a position detector.

20 Claims, 10 Drawing Sheets

CONTROL SYSTEM FOR ADJUSTING DAMPING FORCE COEFFICIENT OF SHOCK ABSORBER FOR AUTOMOTIVE SUSPENSION

BACKGROUND OF THE INVENTION

1. Field of the Invention

The present invention relates to improvement in an automotive vehicle suspension, and more particularly to a control apparatus of a damping force coefficient of shock absorber.

2. Description of the Prior Art

Japanese Utility Model Provisional Publication No. 63-146468 discloses a step motor which is provided around its motor core with a position detector of a thin thickness type. In order to exactly control a position of a damper force coefficient adjuster of a shock absorber for a vehicular suspension, it has been proposed and put into practical use that such a step motor is installed to the shock absorber and arranged to control the damping force coefficient by adjusting the position of the step motor on the basis of a detected signal from the position detector of the step motor.

However, difficulties have been encountered with such a vehicular suspension. For example, since the position detector is disposed around the step motor, the diameter of the vehicular suspension becomes large and the production cost is increased.

SUMMARY OF THE INVENTION

It is an object of the present invention to provide an improved vehicular suspension in which a position of the step motor is precisely corrected without using a position detector.

Another object of the present invention is to provide a compactly formed vehicular suspension with a production cost which is inexpensive.

A control system according to the present invention is for a vehicular suspension and comprises a shock absorber which is disposed between a vehicular body and a wheel. An adjusting member is installed to the shock absorber and changes the damping force coefficient of the shock absorber. A step motor is connected to the adjusting member so as to rotatingly drive the adjusting member. A stopper restricts the rotation of the adjusting member. A detecting means detects vehicle behavioral information and outputs a signal indicative of the vehicle behavioral information. A controlling means controls the adjusting member through the step motor into a desired state on the basis of the signal from the detecting means. The controlling means includes a correcting means which corrects the position of the step motor relative to the stopper by outputting drive signals to the step motor.

With this system, it becomes unnecessary to provide a position detecting means in the system. This enables the step motor to be made in a small size and the production cost of this system to be lowered.

BRIEF DESCRIPTION OF THE DRAWINGS

In the drawings, like reference numerals designate like parts and elements throughout all figures, in which.

DETAILED DESCRIPTION OF THE INVENTION

Referring now to FIGS. 1 to 13 there is shown a first embodiment of a control system for a damping force coefficient of a shock absorber for a vehicle suspension.

Figure 1:
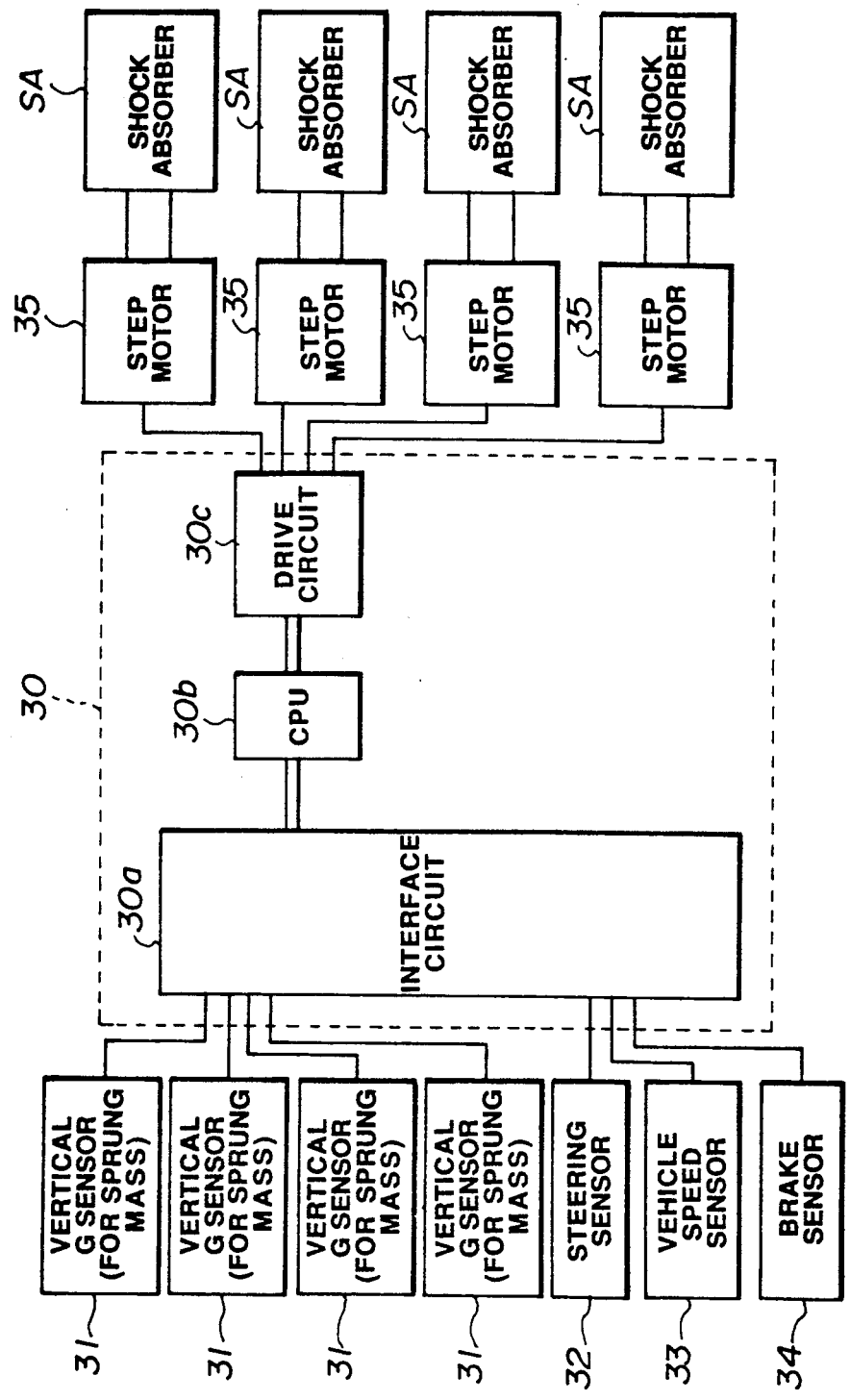
FIG. 1 is a block diagram which shows a first embodiment of a control system in a damping force coefficient of a shock absorber for a vehicle suspension.

As shown in FIG. 1, the control system comprises a control unit 30 which includes an interface circuit 30a, a central processing unit (CPU) 30b, and a drive circuit 30c. The interface circuit 30a is connected to four vertical acceleration sensors 31 (for each sprung mass), a steering sensor 32, a vehicle speed sensor 33 and a brake sensor 34 which serve as a vehicle behavioral information detecting means for outputting signals indicative of the vehicle motions. The control unit 30 receives the signals indicative of vehicle behavioral information at the interface circuit 30a and process them at the CPU 30b. Then, the control unit 30 outputs drive signals from the drive circuit 30c to four step motors 35 connected to four shock absorbers SA, respectively. Each of the step motors 35 is respectively arranged to change the damping force coefficient of each shock absorber SA according to the respective drive signals from the drive circuit 30c. Further, the control unit 30 is provided with a position controller for correcting the set position and the home position of each of the step motors 35.

Figure 2:
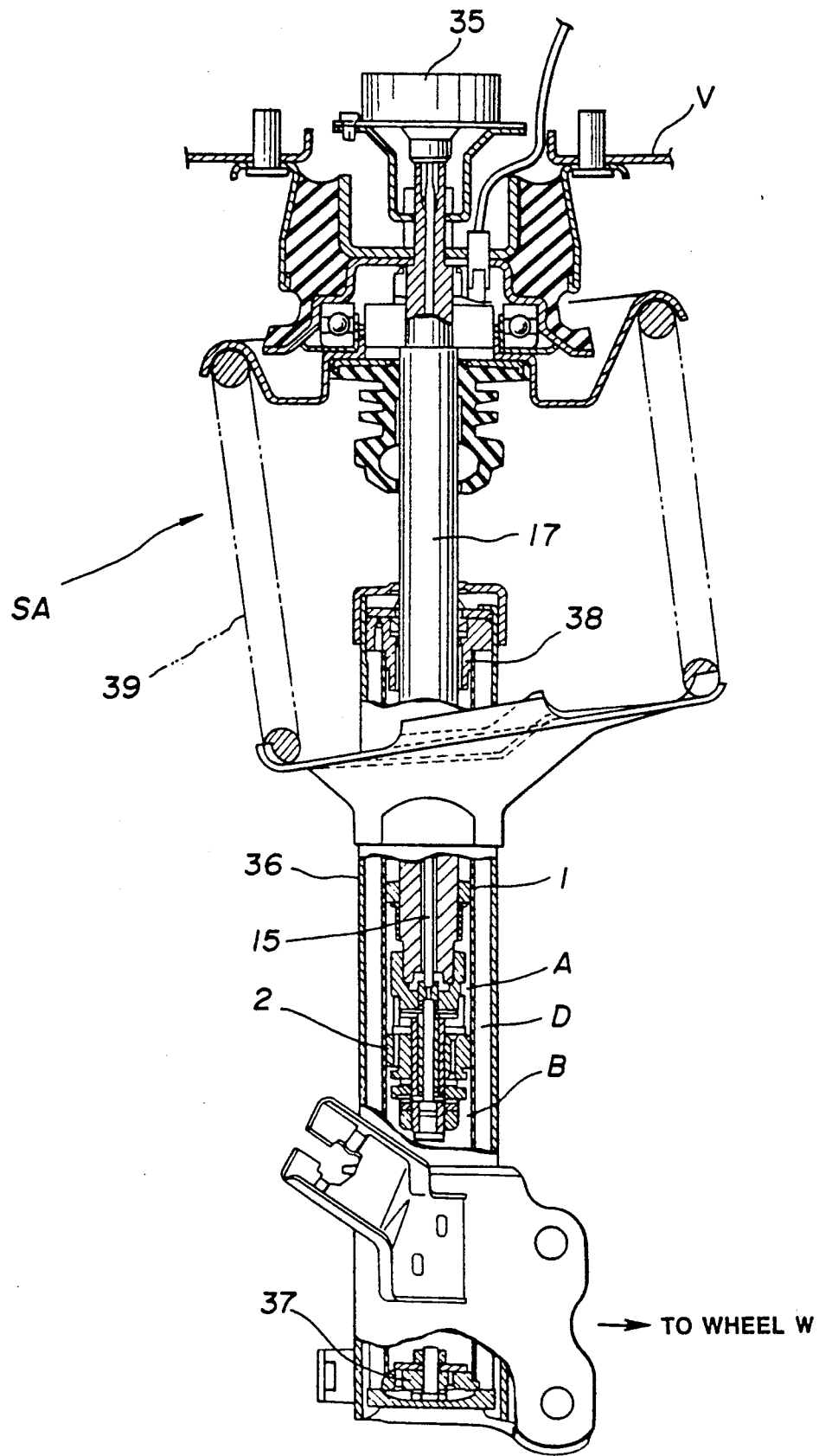
FIG. 2 is a cross-sectional view of the vehicle suspension applying the control system of FIG. 1.

As shown in FIG. 2, the shock absorber SA is connected at its upper portion to a vehicle body V and at its lower portion to a wheel W of an automotive vehicle. The shock absorber SA is provided with a cylinder 1 which is divided into an upper chamber A and a lower chamber B by a piston 2. An outer cylinder 36 is disposed to coaxially surround the cylinder 1 and defines a reservoir chamber D with the cylinder 1. A base member 37 is connected to a lower end of the cylinder 1 in order to divide the lower chamber B and the reservoir chamber D. The piston 2 is slidably and sealingly disposed in the cylinder 1 and connected to a lower end of a piston rod 17 which is supported by a guiding member 38 connected to an upper end of the cylinder 1. The other end of the piston rod 17 is connected to the step motor 35. A suspension spring 39 is disposed between the outer cylinder 36 and the vehicle body V.

Figure 3:
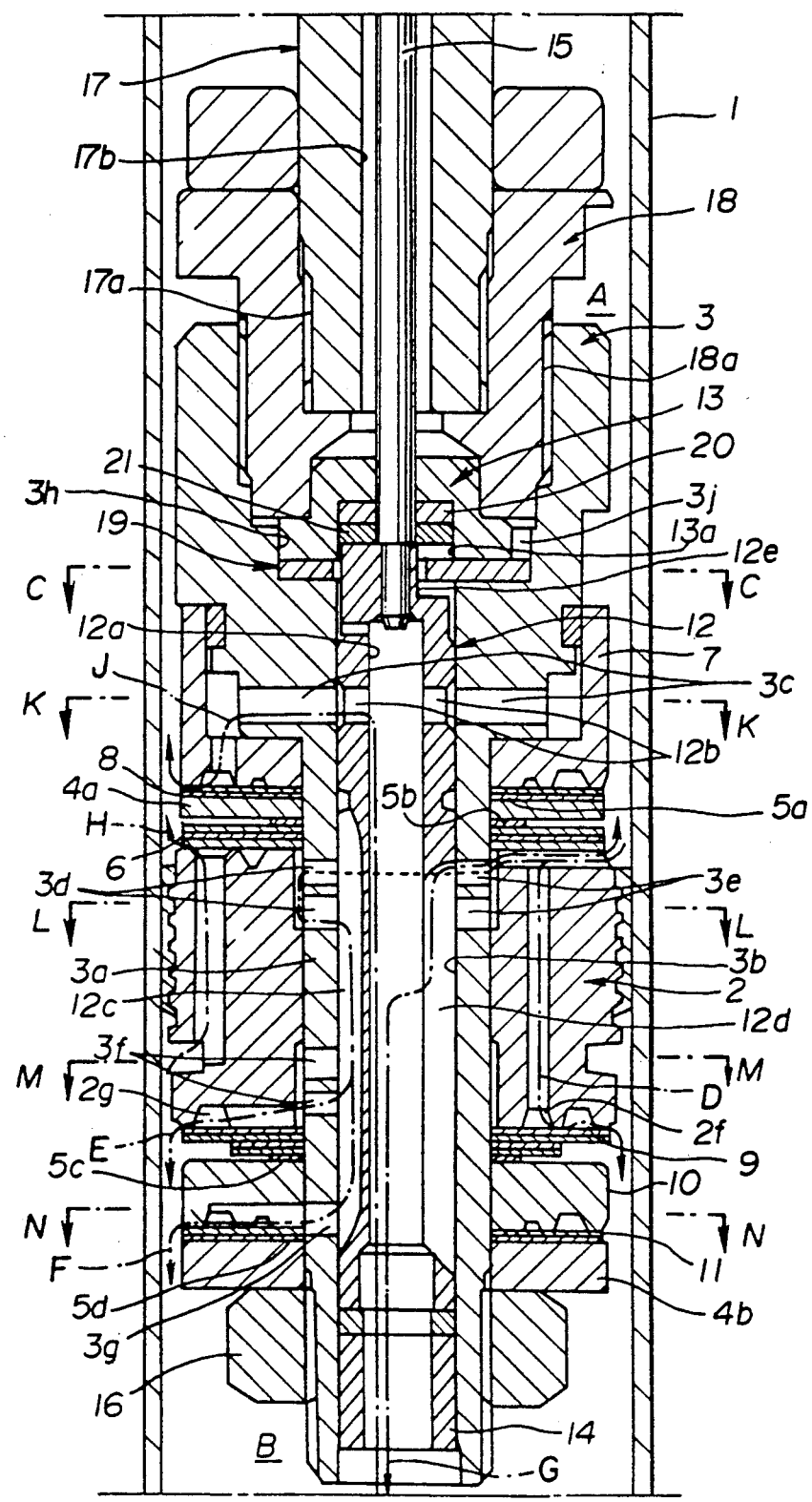
FIG. 3 is an enlarged cross-sectional view showing a part of a piston unit of the shock absorber of FIG. 2.

As shown in FIG. 3, the piston 2 is connected to a tip end portion 3a of a stud 3 which is screwed to an outer screw portion 18a of a rebound stopper 18 screwed to a tip screw portion 17a of the piston rod 17. During assembly, after mounting a control rod 15 within the piston rod 17, a compression side check body 7, a compression stage check valve 8, a washer 5a, a collar 4a, a washer 5b, a compression stage damping valve 6, a piston 2, a tension stage damping valve 9, a washer 5c, a tension stage check body 10, a tension stage check valve 11, a washer 5d and a collar 4b are installed in turn to the tip end portion 3a of the stud 3, and a nut 16 is finally installed to and fixed to the tip end portion 3a of the stud 3.

The stud 3 has a hollow 3b which is formed to pass through the stud 3 along its center axis portion. A first port 3c, a second port 3d, a third port 3e, a fourth port 3f and a fifth port 3g are formed to penetrate the stud 3 so as to be perpendicular to the hollow 3b as shown in FIG. 3. The second and fourth ports 3d and 3f are formed in the same radial direction. The first, third and fifth ports 3c, 3e and 3g are formed in different radial directions relative to each other as shown in FIGS. 6a to 8c.

An adjusting member 12 is rotatably disposed in the hollow 3b of the stud 3 while being sandwiched between upper and lower bushings 13 and 14 of a ring shape. The adjusting member 12 is formed in a cylindrical shape and has a hollow 12a which penetrates an axial portion of the adjusting member 12. The lower end of the hollow 12a is communicated with the lower chamber B. The adjusting member 12 is provided at its outer peripheral portion with a first lateral hole 12b, a vertical groove 12c and a second lateral hole 12d. The first lateral hole 12b is formed to communicate the first port 3c and the hollow 12a. The vertical groove 12c is formed to communicate the second, fourth and fifth ports 3d, 3f and 3g. The second lateral hole 12d is formed to communicate the third port 3e and the hollow 12a.

The shock absorber SA is arranged to have four passages (first, second, third and bypass passages D, E, F and G) during a tension stage. The first passage D is arranged to extend from an inner groove 2f through the tension stage damping valve 9 to the lower chamber B. The second passage E is arranged to extend from the second and fourth ports 3d and 3f through another groove 2g to the damping valve 9. The third passage F is arranged to extend from the second and fifth ports 3d and 3g through the check valve 11 to the lower chamber B. The bypass passage G is arranged to extend from the third port 3e through the hollow 12a to the lower chamber B.

On the other hand, during a contraction stage the shock absorber SA is arranged to have three passages (first and second passages H and J, and the bypass passage G). The first passage H is arranged to extend from the lower chamber B through the damping valve 6 to the chamber A. The second passage J is arranged to extend from the hollow 12a and the first port 3c through the check valve 8 to the upper chamber A. The bypass passage G is arranged to extend from the third port 3e through the hollow 12a to the lower chamber A.

The stud 3 is provided at its upper portion with a stud hole 3h which is larger in diameter than the hollow 3b. The upper bush 13 and a stopper plate 19 are sandwiched between a ring-shaped bottom portion of the hollow 3b and a rebound stopper 18. The upper bush 13 is provided at its lower portion with a bush hole 13a in which a low-friction thrust washer 20 and a metal thrust washer 21 are received and the upper portion of the adjusting member 12 is rotatably inserted.

Figure 4:
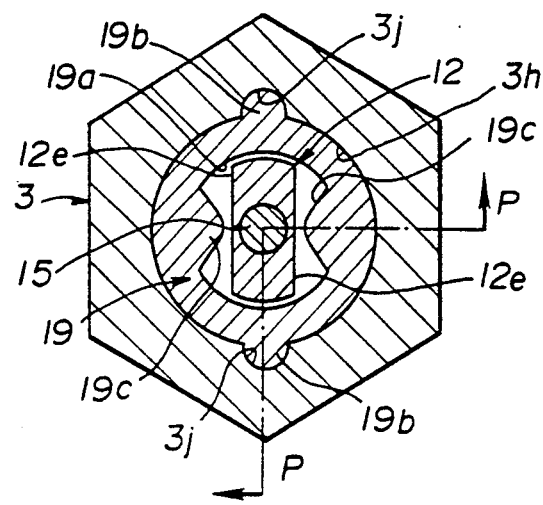
FIG. 4 is a cross-sectional view of the shock absorber taken in the direction of the arrows substantially along the line C—C of FIG. 3.
Figure 5:
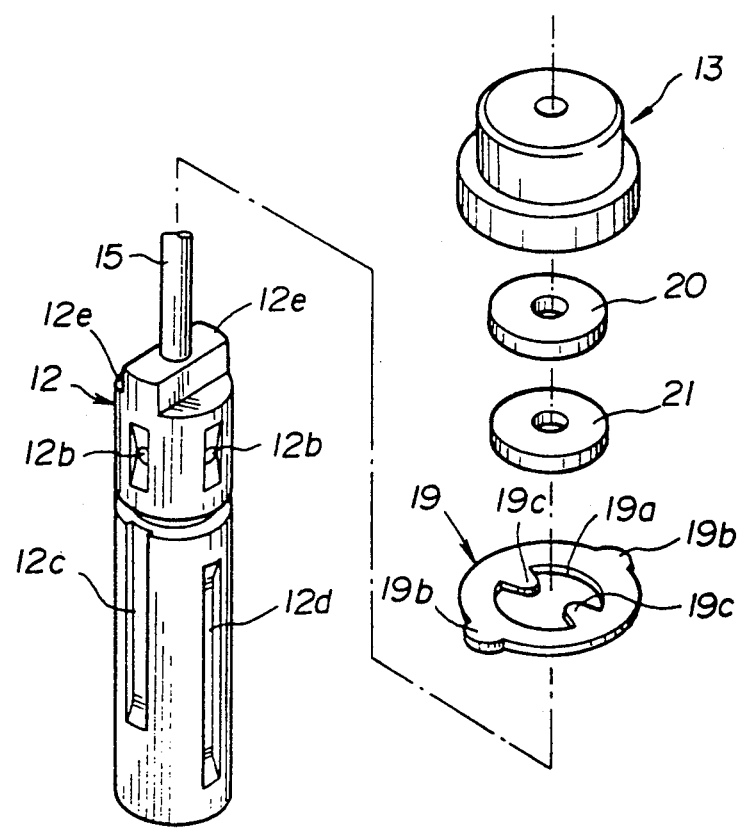
FIG. 5 is an exploded perspective view of an adjusting member applied to the shock absorber of FIG. 4.

As shown in FIGS. 4 and 5, the stopper plate 19 has a center hole 19a and is formed in a ring shape having a pair of projections 19c at its inner periphery and a pair of projections 19b at its outer periphery. The upper portion of the adjusting member 12 is rotatably installed in the center hole 19a and restricted in rotation by the projections 19c. The projections 19b are received in the plate fixing grooves 3i formed at the inner wall of the hole 3h by means of drilling.

The upper end portion of the adjusting member 12 is machined to have a pair of parallel flat surfaces 12e as shown in FIGS. 4 and 5. The projections 19c restrict the rotation of the adjusting member 12 by being in contact with the flat surfaces 12e. Thus, the projections 19c and the flat surfaces 12e act as a stopper means.

The adjusting member 12 is rotated by the control rod 15 which extends through the hole 17b to the upper end portion of the piston rod 17. The control rod 15 is connected to and rotated by the step motor 35.

The adjusting member 12 is arranged to change the damping force coefficient of the shock absorber SA by selectively taking one of three states as shown in FIG. 6a to 8c, in accordance with the command from the center unit 30.

Figure 7A:
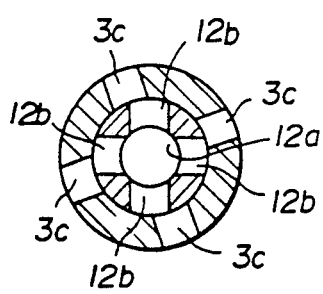
FIGS. 7a, 7b and 7c are cross-sectional views of the piston unit under a second control stage, taken in the direction of arrows substantially along the respective lines K—K, L—L (and M—M) and N—N of FIG. 3.
Figure 7B:
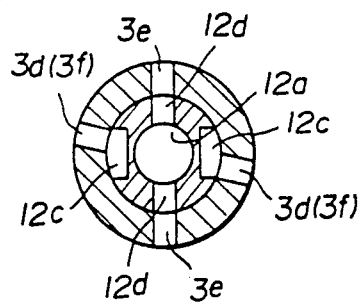
Figure 7C:
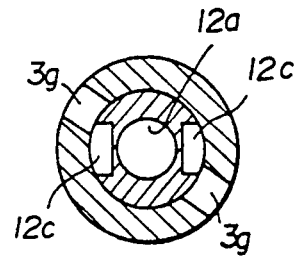
Figure 9:
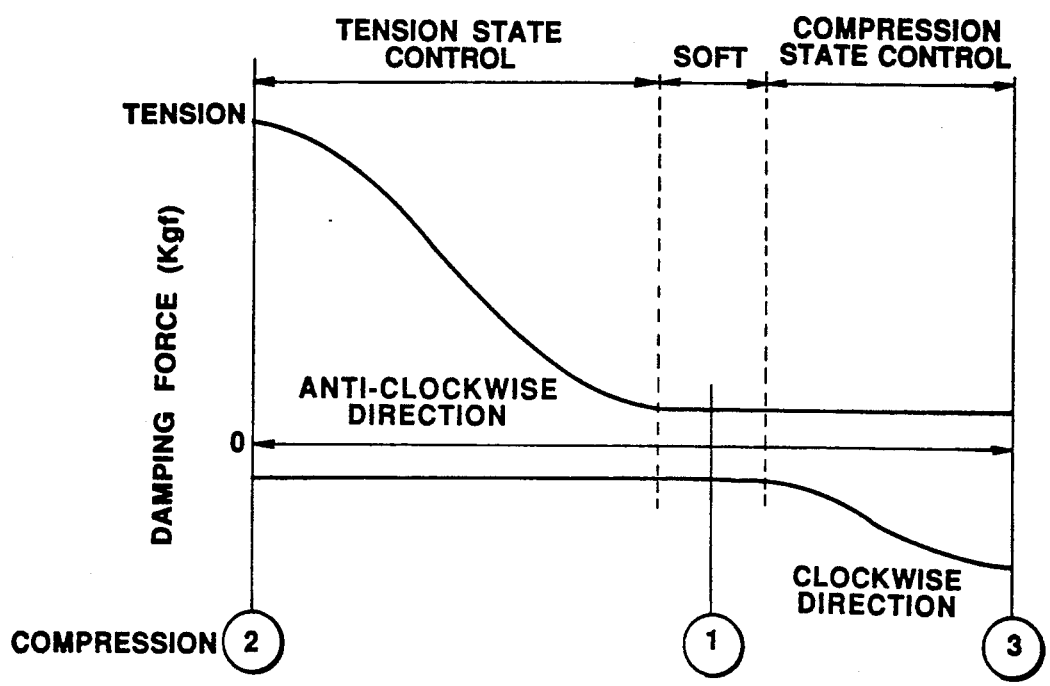
FIG. 9 is a graph showing conditions of a damping force coefficient of the shock absorber under the first, second and third stage of control.
Figure 11:
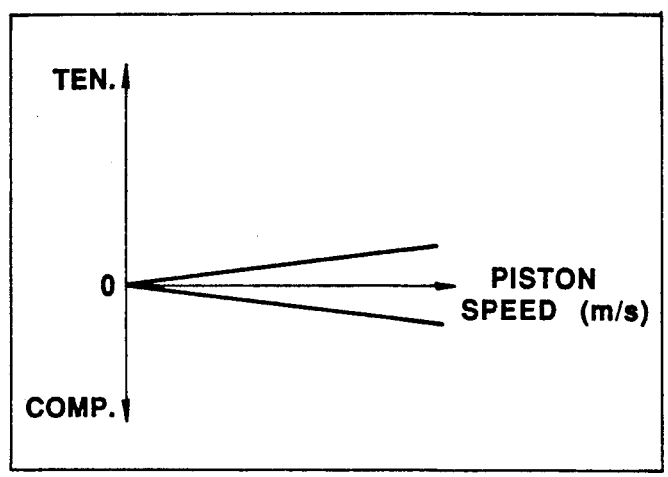
FIG. 11 is a graph which shows the damping force coefficient property relative to the piston speed under the first control stage.

When the adjusting member 12 is set in an intermediate (a first) control condition as indicated by (1) in FIG. 9, the first, second, third, fourth, and fifth ports 3c, 3d, 3e, 3f and 3g are opened so as to set the passages H, J and G in a communicated condition as shown in FIGS. 7a, 7b and 7c. In this position, the shock absorber SA is set to have a low damping force coefficient (called SOFT) in the tension and compression stages as shown in FIG. 11.

Figure 6A:
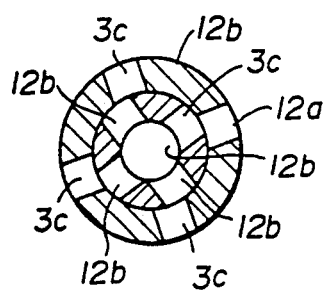
FIGS. 6a, 6b and 6c are cross-sectional views of the piston unit under a first control stage, taken in the direction of arrows substantially along the respective lines K—K, L—L (and M—M) and N—N of FIG. 3.
Figure 6B:
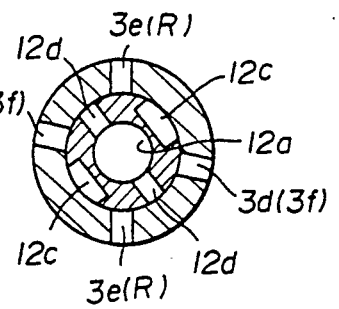
Figure 6C:
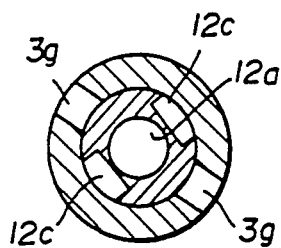
Figure 10:
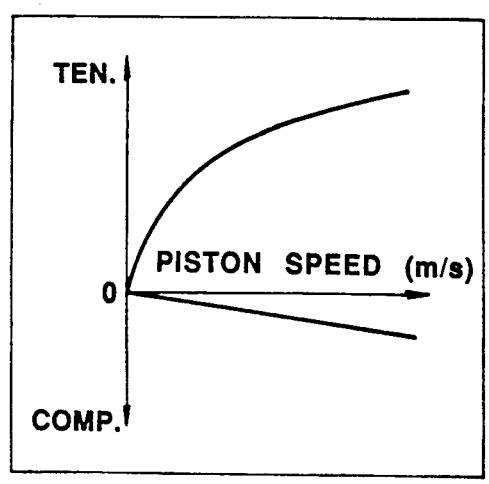
FIG. 10 is a graph which shows the damping force coefficient property relative to a piston speed under the second control stage.

When the adjusting member 12 is set at a tension (a second) control condition as indicated by (2) in FIG. 9, the first port 3c is opened and the second, third, fourth and fifth ports 3d, 3e, 3f and 3g are opened. Accordingly, the first passage D, the first passage H and the second passage J are set in a communicated condition, as shown in FIG. 6a, 6b and 6c. In this position, the shock absorber SA is set to have a high damping force coefficient (called HARD) in the tension stage and to be SOFT in the compression stage, as shown in FIG. 10.

When the adjusting member 12 is set at a compression (a third) control condition as indicated by (3) in FIG. 9, the second, fourth and fifth ports 3c, 3f and 3g are opened and the first and third ports 3c and 3e are closed.

Figure 8A:
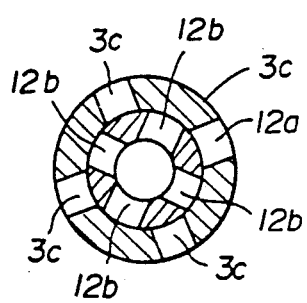
FIGS. 8a, 8b and 8c are cross-sectional views of the piston unit under a third control stage, taken in the direction of arrows substantially along the respective lines K—K, L—L and (and M—M) and N—N of FIG. 3.
Figure 8B:
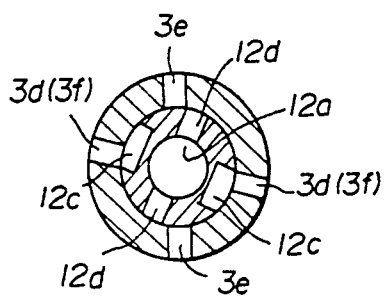
Figure 8C:
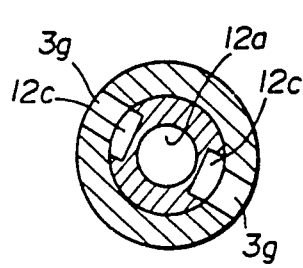
Figure 12:
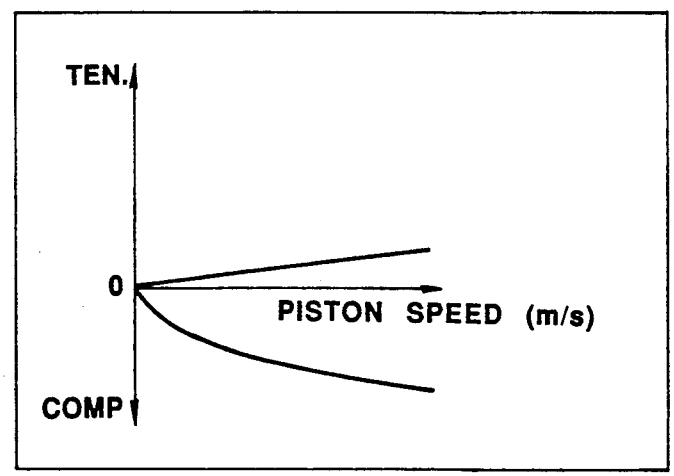
FIG. 12 is a graph which shows the damping force coefficient property relative to the piston speed under the third control stage.

Accordingly, the tension stage first, second and third passages D, E, F and the compression stage first passage H are set in a communicated condition, as shown in FIGS. 8a, 8b and 8c. In this position, the shock absorber SA is set to be SOFT in the tension stage and to be HARD in the compression stage, as shown in FIG. 12.

When the adjusting member 12 is rotated from the position (1) to the position (2) in the anti-clockwise direction as viewed in FIG. 4, the cross-sectional areas of the bypass passage G, the tension stage second and third passages E and F are decreased due to the gradual closing of the second, third, fourth and fifth ports 3d, 3e, 3f and 3g. With this rotation, the shock absorber SA is changed from SOFT to HARD in the tension stage while being kept in SOFT in the compression stage, as shown in FIG. 9.

When the adjusting member 12 is rotated from the position (2) to the position (3) in the clockwise direction as viewed in FIG. 4, the cross-sectional areas of the bypass passage G, the compression stage second passage D and the tension stage third passage F are decreased due to the gradual closing of the first and third ports 3c and 3e. With this rotation, the shock absorber SA is changed from SOFT to HARD in the compression stage while being kept in SOFT in the tension stage, as shown in FIG. 9.

Before the damping force coefficient controlling operation by the damping force coefficient controller, the step motor 35 is set at the home position. Since the step motor 35 does not have a home position itself, it is determined from the relationship between the adjusting member 12 and the stopper plate 19. Such a setting operation of the step motor 35 is carried out by the following steps: 1) The adjusting member 12 is rotated in one direction until the flat surface 12e is in contact with the projections 19c. 2) Then, the step motor 35 is reversely rotated from a contact point by predetermined steps. With this stepping rotation, the step motor 35 is set at a home position.

Following this, the adjusting member 12 is set at a desired position by rotating the step motor 35 to a desired direction by desired steps.

Figure 13:
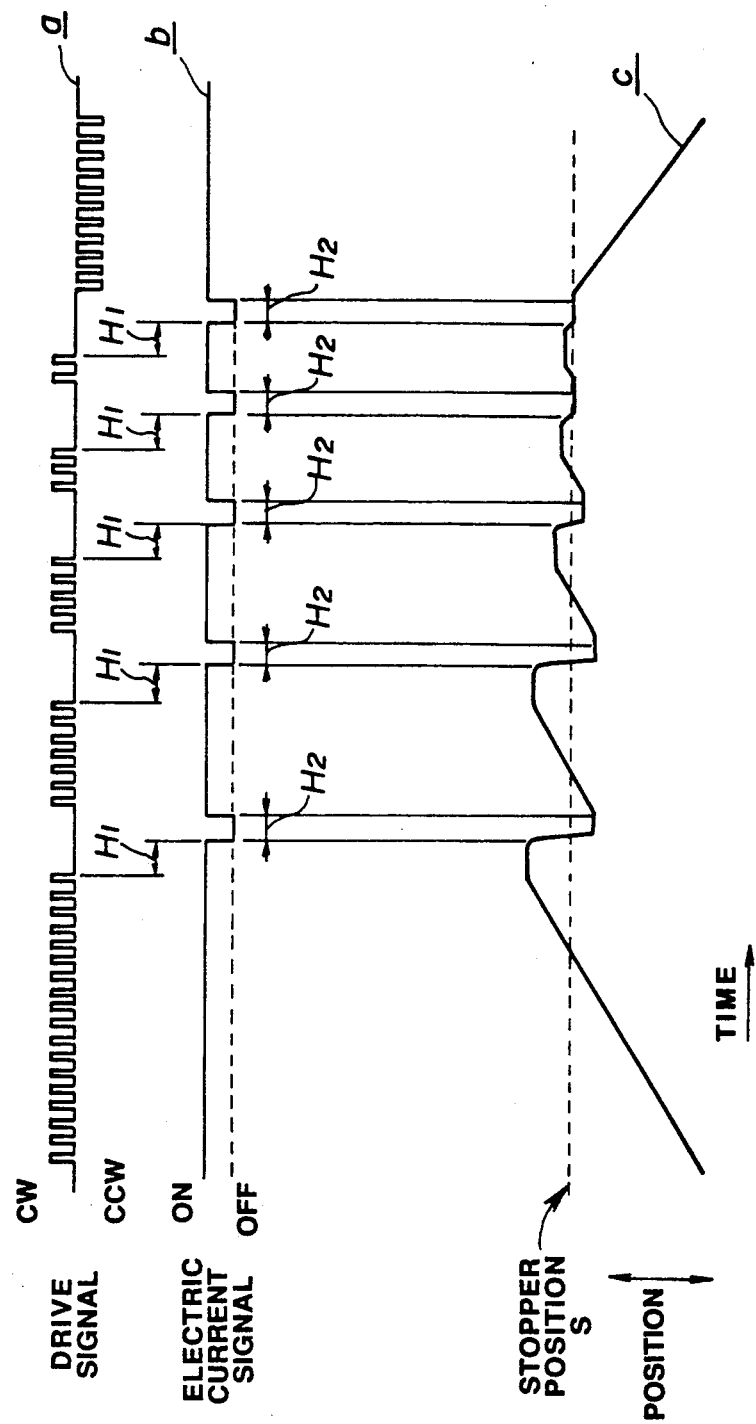
FIG. 13 is a time chart showing a control operation of the control system of FIG. 1.

FIG. 13 shows a time chart for explaining an operation of the position controller. In this time chart, a curve a represents an output condition of the drive signal, a curve b represents a ON-OFF current signal applied to the step motor 35, and a curve c represents a position of the step motor 35 relative to a stop position of the adjusting member 12. That is, when an ignition switch of the vehicle is turned ON, the drive signals for determining a position and the home position of the step motor 35 are outputted from the drive circuit 30c. The drive signals are divided into five groups which are different in their number of steps from each other so as to be gradually decreased in number. Then, the divided group is in the order of the large number intermittently outputted. That is, the number of the rotatable steps in the range restricted by the projections 19c and the adjusting member 12 divided into five groups so that the number of steps is gradually decreased from a first group to a fifth group. Then, the divided signals are in turn outputted. For example, when the number of the rotatable steps in the restricted range is 35, 18 steps are applied first, 7 steps are applied second, 5 steps third, 3 steps fourth and 2 steps are applied fifth.

For a time after an output of the drive signal until a next output of the drive signal, the step motor 35 is held at a stop position for a predetermined time $H_1$ by keeping the electric current signal ON. Then, the electric current signal is turned OFF for a second predetermined time $H_2$. With this operation, when the adjusting member 12 is rotated due to the stepping drive of the step motor 35 and restricted in rotation by the stopper means as shown in FIG. 13, the step motor 35 is further rotated from a stop point so as to move over the stop point by the twisted amount of the control rod 15. Then, for the predetermined time $H_1$ the step motor 35 is held at the stopped position for removing its vibration by utilizing power due to the twist. Next, the electric current signal is turned OFF for the second predetermined time $H_2$. This reversely rotates the step motor 35 to a point which is slightly over the stop position S as shown in FIG. 13. By repeating this operation, the step motor 35 is finally stopped at the stop position S with a high accuracy. Then, the step motor 35 is reversely rotated by predetermined steps so as to be set at the home position.

With the thus arranged system, it is not necessary to provide a position detecting means in the system. This enables the step motor to be made in a small size and the production cost of this system to be lowered. Furthermore, since the control system is arranged such that the drive signal is temporarily stopped before turning off the electric current signal, the vibration of the step motor 35 is removed even if the resonant point of the step motor 35 is similar to that of the control rod 15.

Figure 14:
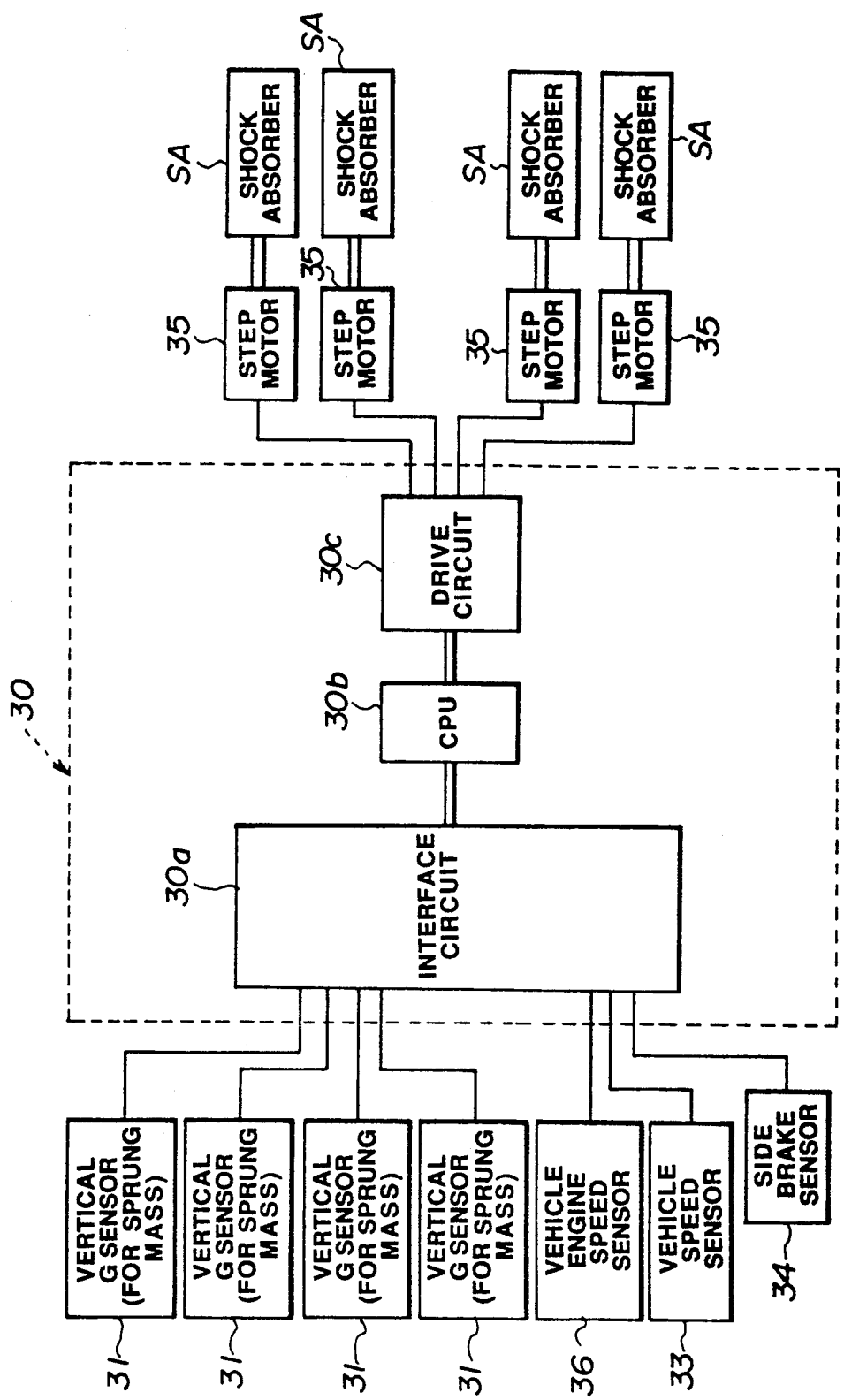
FIG. 14 is a block diagram which shows a second embodiment of a control system of a damping force coefficient of a shock absorber for a vehicle suspension.
Figure 15:
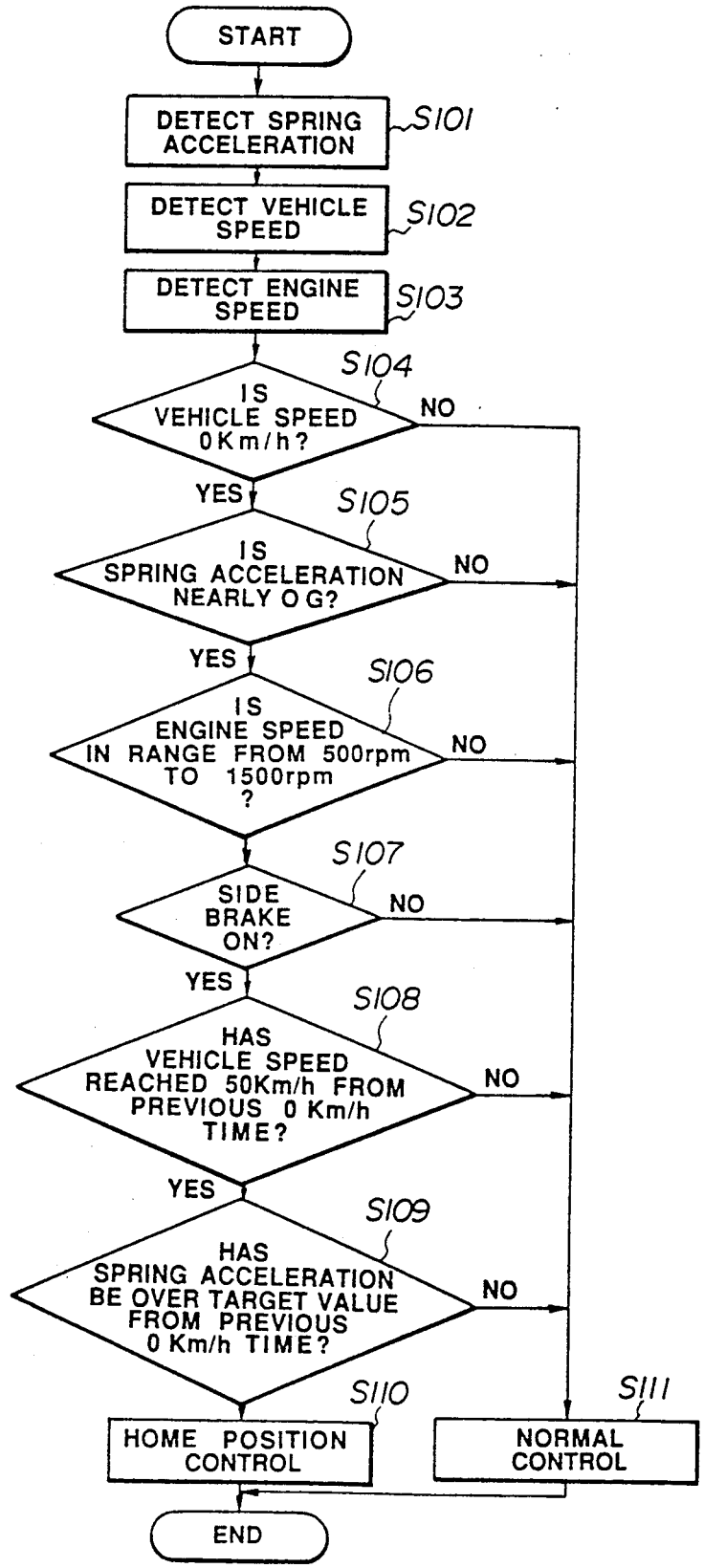
FIG. 15 is a flowchart of a control operation for re-determining the home position of the step motor by the control system of FIG. 14.

Referring now to FIGS. 14 and 15, there is shown a second embodiment of the control system of a damping force coefficient of a shock absorber for a vehicle suspension.

The second embodiment is similar to the first embodiment except that an engine speed sensor 36 instead of the steering sensor 32 is connected to the interface circuit 30a, as shown in FIG. 14.

The operation for determining the position and the home position of the step motor 35 in the second embodiment is carried out as in the first embodiment even if the automotive vehicle starts to be driven. The manner of operation during the running condition will be discussed hereinafter with reference to a flow chart shown in FIG. 15.

In steps S101, S102 and S103, the vertical acceleration, the vehicle speed and the engine speed are detected from the acceleration sensors 31, the engine speed sensor 36, the vehicle speed sensor 33 and the brake sensor 34, after the starting of the vehicle. Following this, the program proceeds to a step S104.

In the step S104, it is judged whether the vehicle speed is 0 km/h or not. When the vehicle speed is 0 km/h, the program proceeds to a step S105. When not 0 km/h, the program proceeds to a step S111 wherein the control of the damping force coefficient is carried out (normal control).

In the step S105, it is judged whether the shock absorber SA is in an operative state or not. That is, it is judged whether the vertical acceleration for a sprung mass is nearly 0 or more. When the vertical acceleration is nearly 0, the program proceeds to a step S106. When in greater than 0, the program proceeds to the step S111.

In the step S106, it is judged whether the engine is operated. When the engine speed is in the range from 500 rpm to 1500 rpm, the program proceeds to a step S107. When not in the range from 500 rpm to 1500 rpm, the program proceeds to the step S111.

In the step S107, it is judged whether the side brake operation switch is turned ON or not, in order to further securely confirm the stopping state of the vehicle. When the side brake operation switch is turned ON, the program proceeds to a step S108. When turned OFF, the program proceeds to the step S111.

In the step S108, it is judged whether the vehicle has been in a running condition or not. When the vehicle speed has reached 50 km/h for a time period from a previous time when the vehicle speed was 0 km/h to a present time, the program proceeds to a step S109. When the vehicle speed has not reached 50 km/h for the time period, the program proceeds to the step S111.

In the step S109, it is judged whether the vibration for sprung mass has been violent or not. When the vertical acceleration has been over the target value for a time period from a previous time when the vehicle speed was 0 km/h to a present time, the program proceeds to a step S110 wherein the control for determining the home position of the step motor 35 is carried out. When the vertical acceleration not been over the predetermined value for a time period, the program proceeds to the step S111.

The above-mentioned routine shown in FIG. 15 is repeated in the control unit 30 during the engine operating condition.

With the thus arranged system, the position control of the step motor is carried out when a vehicle speed and a target vertical acceleration for sprung mass become greater than predetermined values. Accordingly, by properly determining the target values, the number of the position controls is decreased by canceling the excess controls such as a control during the repeat of a low speed running and a stopping under a traffic snarl, and a control after running on a good road.

Although the stopper means has been shown and described to be connected to the adjusting member in the preferred embodiment of the present invention, it will be understood that the stopper means may be connected to the control rod.

While the embodiment of the present invention has been shown and described such that the position control of the step motor is started corresponding to a turning on operation of the ignition switch, it will be understood that the starting timing of position control may be determined corresponding to the engine speed.

What is claimed is:

1. A control system for a vehicular suspension, comprising:
a shock absorber disposed between a vehicular body and a wheel;
an adjusting member installed in said shock absorber and changing the damping force coefficient of said shock absorber;
a step motor connected to said adjusting member so as to rotatingly drive said adjusting member;
a stopper restricting rotation of said adjusting member;
means for detecting vehicle behavioral information and outputting a signal indicative of the vehicle behavioral information; and
means for controlling said adjusting member through said step motor into a desired state on the basis of the signal from said detecting means, said controlling means including a correcting means which sets said adjusting member at a home position relative to said stopper by outputting predetermined drive signals by installments to said step motor.

2. A control system as set forth in claim 1, wherein said adjusting member includes means for changing the damping force coefficient of the shock absorber by selectively taking one of at least two values in at least one of at least two stages of tension and compression.

3. A control system as set forth in claim 2, wherein said adjusting member changing means changes the damping force coefficient of the shock absorber by selectively taking one or more of the following states: (a) a low damping force coefficient in both tension and compression stages; (b) a high damping force coefficient in the tension stage and a low damping force coefficient in the compression stage; and (c) a low damping force coefficient in the tension stage and a high damping force coefficient in the compression stage.

4. A control system as set forth in claim 3, wherein said adjusting member is rotatably disposed in said shock absorber and has openings formed to selectively coact with openings in said shock absorber, said stopper having a stopper plate having at least a projection for mating with a surface on said adjusting member to restrict rotation of said adjusting member.

5. A control system for a vehicular suspension, comprising:
a shock absorber disposed between a vehicular body and a wheel;
an adjusting member installed in said shock absorber and changing the damping force coefficient of said shock absorber;
a step motor connected to said adjusting member so as to rotatingly drive said adjusting member;
a stopper restricting rotation of said adjusting member;
means for detecting vehicle behavioral information and outputting a signal indicative of the vehicle behavioral information; and
means for controlling said adjusting member through said step motor into a desired state on the basis of the signal from said detecting means, said controlling means including a means which sets said adjusting means at a home position by using rotatable steps within a movable range of said rotation of said adjusting member determined in part by said stopper wherein said rotatable steps are divided into several groups which are different in number of steps from each other so as to be gradually decreased in number, the groups being intermittently outputted in a numerical order as drive signals.

6. A control system as claimed in claim 5, wherein said correcting means further processes a command that the supply of electric power to said step motor is stopped during an intermittent time period between outputting periods of a group of the drive signals and the next group of drive signals.

7. A control system as claimed in claim 6, wherein said correcting means further processes a command that the drive signal is stopped for a predetermined time before the supply of electric power to said step motor is stopped.

8. A control system as claimed in claim 5, wherein said detecting means includes a plurality of vertical acceleration sensors for a sprung mass.

9. A control system as claimed in claim 8, wherein said correcting means starts to process when the vehicle speed is 0 km/h after a vertical acceleration sensor detected an acceleration value which is greater than a predetermined value and when engine speed is in a predetermined range.

10. A control system as claimed in claim 9, wherein a predetermined range of engine speed is from 500 rpm to 1500 rpm.

11. A control system as set forth in claim 2, wherein said adjusting member includes means for changing the damping force coefficient of the shock absorber by selectively taking one of at least two values in at least one of at least two stages of tension and compression.

12. A control system as set forth in claim 11, wherein said adjusting member changing means changes the damping force coefficient of the shock absorber by selectively taking one or more of the following states: (a) a low damping force coefficient in both tension and compression stages; (b) a high damping force coefficient in the tension stage and a low damping force coefficient in the compression stage; and (c) a low damping force coefficient in the tension stage and a high damping force coefficient in the compression stage.

13. A control system as set forth in claim 12, wherein said adjusting member is rotatably disposed in said shock absorber and has openings formed to selectively coact with openings in said shock absorber, said stopper having a stopper plate having at least a projection for mating with a surface on said adjusting member to restrict rotation of said adjusting member.

14. A control system of a damping force coefficient of a shock absorber for a vehicular suspension, said shock absorber disposed between a vehicular body and a wheel, said system comprising:
 an adjusting member installed in said shock absorber and changing the damping force coefficient of said shock absorber;
 a step motor connected to said adjusting member so as to rotatingly drive said adjusting member;
 a stopper restricting rotation of said adjusting member;
 means for detecting vehicle behavioral information and outputting a signal indicative of the vehicle behavioral information;
 means for controlling said adjusting member through said step motor into a desired state on the basis of the signal from said detecting means; and
 means for correcting a home position of said adjusting member through said step motor, said correcting means correcting the home position by outputting predetermined drive signals in installments to said step motor before a start of the adjusting member control of said step motor.

15. A control system as set forth in claim 14, wherein said adjusting member includes means for changing the damping force coefficient of the shock absorber by selectively taking one of at least two values in at least one of at least two stages of tension and compression.

16. A control system as set forth in claim 15, wherein said adjusting member changing means changes the damping force coefficient of the shock absorber by selectively taking one or more of the following states: (a) a low damping force coefficient in both tension and compression stages; (b) a high damping force coefficient in the tension stage and a low damping force coefficient in the compression stage; and (c) a low damping force coefficient in the tension stage and a high damping force coefficient in the compression stage.

17. A control system as set forth in claim 16, wherein said adjusting member is rotatably disposed in said shock absorber and has openings formed to selectively coact with openings in said shock absorber, said stopper having a stopper plate having at least a projection for mating with a surface on said adjusting member to restrict rotation of said adjusting member.

18. A position initializing device of a step motor in a shock absorber which variably changes its damping force coefficient, the shock absorber being disposed between a vehicular body and a wheel of an automotive vehicle, an adjusting member being installed in the shock absorber and fixedly connected to the step motor, said position initializing device comprising;
 a stopper restricting the rotation of the adjusting member; and
 an initializing means which sets the adjusting member at a home position in such a manner that rotatable steps corresponding to a movable range of said adjusting member between said stopper are divided into several groups which are different in number of steps from each other so as to be gradually decreased in number, the groups being intermittently outputted in numerical order as drive signals.

19. A control system as set forth in claim 18, wherein said adjusting member includes means for changing the damping force coefficient of the shock absorber by selectively taking one of at least two values in at least one of at least two stages of tension and compression.

20. A control system as set forth in claim 19, wherein said adjusting member changing means changes the damping force coefficient of the shock absorber by selectively taking one or more of the following states: (a) a low damping force coefficient in both tension and compression stages; (b) a high damping force coefficient in the tension stage and a low damping force coefficient in the compression stage; and (c) a low damping force coefficient in the tension stage and a high damping force coefficient in the compression stage.

* * * * *